Fig. 1.

Oct. 6, 1964        J. C. EVRAETS        3,151,660

FLUID FLOW CONTROL DEVICES

Filed Feb. 5, 1960        7 Sheets-Sheet 7

United States Patent Office 3,151,660
Patented Oct. 6, 1964

3,151,660
FLUID FLOW CONTROL DEVICES
John C. Evraets, Los Angeles, Calif., assignor to Robertshaw Controls Company, a corporation of Delaware
Filed Feb. 5, 1960, Ser. No. 6,891
12 Claims. (Cl. 158—123)

This invention relates to fluid control devices and, more particularly, to valve devices wherein a change in the operative conditions of a control determines the flow of fluid through the fluid control device.

In systems requiring a fluid control valve that is rapidly responsive to an operative condition, such as a thermostat controlling a heated space temperature, it has been difficult to control the main valve of the gaseous inlet supply and the pilot control valve under all conditions that may be encountered. In addition, fluid control valves for controlling the flow of fluid to heating systems generally comprise a diaphragm member vented to the atmosphere; which vent very often becomes plugged, thereby causing failure in the operation of the valve.

To overcome these difficulties, a control system should combine regulation of the temperature responsive means controlling fluid flow to the main burner, with an automatic control for opening or closing the pilot supply when the pilot light is extinguished. Further, the diaphragm of the control valve should be internally vented to another portion of the fluid flow to prevent plugging and, in addition, the fluid flow should control the actuation of the diaphragm to its open or closed position, thereby controlling the main valve.

In the present invention, advantage has been taken of the physical property exhibited by gases passing through a constriction in a tube, such as a venturi tube, in which a fluid stream that varies in cross section has its least pressure at the point where the velocity is the greatest. The diaphragm of the fluid control device, in a heating system, is vented to the pilot flow in which the pilot flow passes through a venturi-like tube, so that control of the pilot flow will determine the pressure in the vent connected to the venturi-like tube to thereby bias the diaphragm and its associated valve in the open or closed position. Further, the pilot flow control is an electromechanical means which consists of a thermoelectric element that is heat responsive to the pilot to generate electrical energy, which energy is used to actuate a valve mechanism to open or close the venturi tube.

Therefore, it is the principal object of the present invention to actuate the main valve of a fluid control device by a venturi inserted in a separated fluid flow system, where the fluid flow system is operatively controlled by either a thermoelectric element or a temperature condition responsive means.

A further object of the present invention is to eliminate the need for a vent to a fluid control device whereby the diaphrgam valve will be rapidly responsive to operative conditions.

A further object of this invention is a main fluid valve of the diaphragm type in which an increase in the flow of fluid through a separate fluid control system actuates the main fluid valve to the open position.

Still another object of this invention is a fluid control valve in which a thermoelectric element is electrically connected to a magnetic core for actuating a valve in a control system whereby the main valve of the fluid control device is actuated to its open or closed position in response to the control system.

Other objects and advantages will appear from the following specification taken in conjunction with the accompanying drawings wherein.

Figure 1:
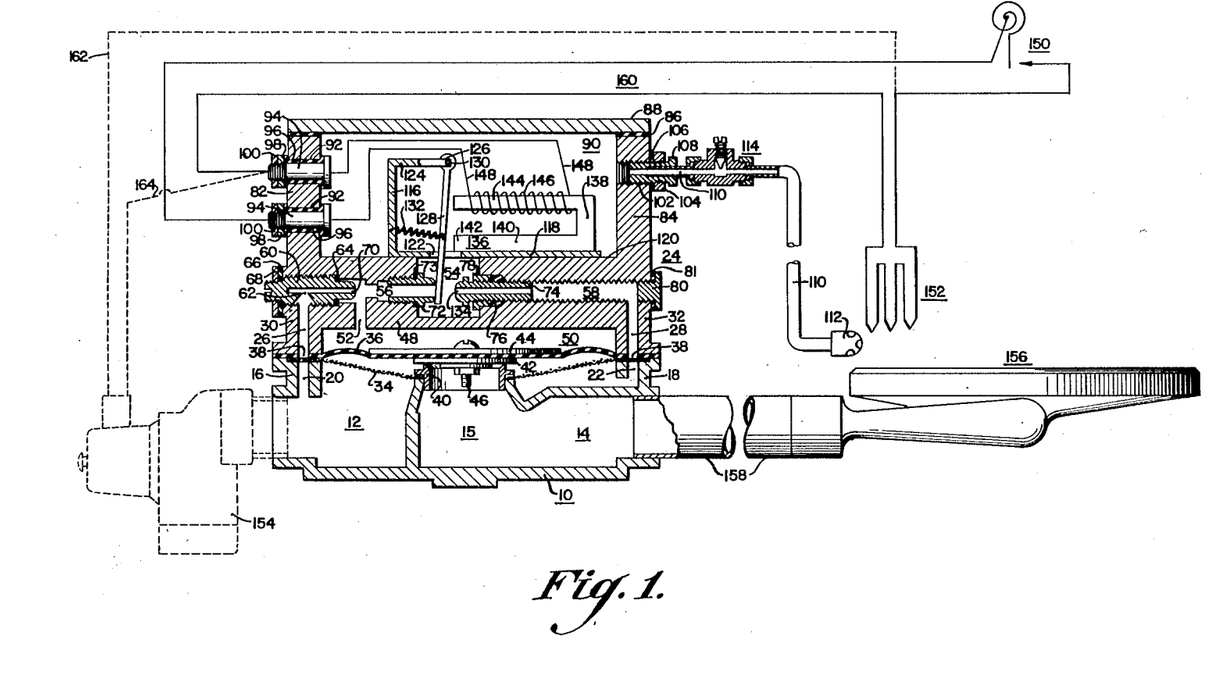
FIG. 1 is a partial schematic view of the fluid control device of the present invention.

Referring more particularly to FIG. 1, there is shown a valve body 10 having an inlet chamber 12 and an outlet chamber 14 intersected by a valve chamber 15, the chambers 12, 14 and 15 defining a lower chamber. Located in upwardly extending oppositely displaced sidewalls 16 and 18 of the valve body 10 are parallel passages 20 and 22, respectively. A housing 24 is located above the valve body 10 and has parallel passages 26 and 28 formed in sidewalls 30 and 32, respectively, to connect with the passages 20 and 22, respectively, located in the valve body 10. Interposed between the valve body 10 and the housing 24 are the outer peripheries of a dust screen 34 and a valve diaphragm 36. Suitable apertures 38 are made in the valve diaphragm 36 to allow fluid flow through the passages 20, 22, 26, and 28 located in the valve body 10 and the housing 24. The dust screen 34 extends from the inner walls of the housing 24 and valve body 10 to the valve chamber 15.

A valve seat 40 is press-fitted to the wall of the valve chamber 15 to retain the dust screen 34 in position. A flat plate valve 42, located on the inlet chamber side of the diaphragm 36, engages the valve seat 40 in the closed position. A loading weight 44 is disposed on the opposite side of the diaphragm 36. The weight 44, valve 42, and the diaphragm 36 are secured together by a bolt, washer and nut assembly 46. The valve diaphragm 36 is made of a suitable flexible material, such as rubber, which will also act as a gasket between the sidewalls of the valve body and the housing.

An intermediate wall 48 extends substantially at right angles to the sidewalls 30 and 32 to form an intermediate chamber 50, between the valve body 10 and the housing 24 in which the diaphragm 36 is located, the diaphragm 36 dividing the intermediate chamber 50 into upper and lower portions. Thus, the upper portion of the intermediate chamber 50 is defined by the diaphragm 36, side walls 30 and 32 of the housing 24 and the intermediate wall 48 of the housing 24 while the lower portion of the intermediate chamber 50 is defined by the top of valve body 10, the upwardly extending side walls 16 and 18 of the valve body 10 and the diaphragm 36. It is to be understood, that the valve diaphragm 36, being of a flexible material, can vertically displace the valve 42 within the intermediate chamber 50.

The intermediate wall 48 of the housing 24 is of a substantial thickness so as to accommodate a port 52, a recess 54 and horizontal passages 56 and 58 therein. The port 52 connects horizontal passage 56 with the intermediate chamber 50, as shown in FIG. 1. The recess 54 is located in the central portion of the intermediate wall 48 and has the horizontal passages 56 and 58 extending therein. Horizontal passage 56 is tapped so as to accommodate a threaded hollow orifice screw 60. The orifice screw 60 has a side aperture 62 which communicates the hollow interior thereof with passage 26. The hollow orifice screw 60 is threadedly engaged in the tapped hole of passage 56 in such a manner that the side aperture 62 communicates with the passage 26. Hollow orifice screw 60 is made gas tight by packing 64, and a rubber washer 66 interposed between the nut 68 and the housing 24. It is to be particularly noted, that the orifice outlet 70 of the hollow orifice screw 60 is closely adjacent to port 52, which communicates with the intermediate chamber 50, as previously described.

Also located in passage 56 and on the opposite side of port 52 from the orifice outlet 70 of the hollow orifice screw 60, is a jet 72. Jet 72 threadedly engages and extends outwardly of passage 56 into the recess 54 of the housing 24 and is made gas tight by a rubber washer 73.

A second horizontal passage 58 communicates the recess 54 of the housing 24 with passage 28, and is disposed substantially opposite to passage 56. A hollow adjustment screw 74 is threadedly engaged in passage 58 and is made gas tight by packing 76 and nut 78. A plug 80 is threadedly engaged with the remote end of the passage 58 and is made gas tight by rubber washer 81.

The housing 24, as shown in FIG. 1, is formed to have upwardly extending sidewalls 82 and 84. A flat gasket 86, made of any suitable gas tight gasketing material, extends about the flat horizontal upper surface of the sidewalls, and is interposed between a housing plate 88 and the housing sidewalls 82 and 84. The intermediate wall 48 of the housing 24 and the sidewalls 82 and 84 of the housing 24 together with the housing plate 88 form an upper chamber or pilot chamber 90 in the housing 24. Adjacently spaced holes 92 are bored in sidewall 82 of the upper chamber 90. In each hole 92, there is located a terminal screw 94, which is gas tight and electrically insulated from the sidewall 82 by insulation 96. The terminal screw 94 is secured in the sidewall 82 by a nut 98 and a lock nut 100.

In FIG. 1, a tapped hole 102 is located in sidewall 84 opposite to sidewall 82. Threadedly engaging the outer portion of tapped hole 102 is a compression fitting 108 which is made gas tight with sidewall 84 by rubber washer 106 compressed by lock nut 104. A tubular member 110 is partially inserted in the length of the bore of compression fitting 108, which fitting is compressed about the tubular member 110 when lock nut 104 is threaded in place. The tubular member 110 connects a common pilot burner 112 to the upper chamber 90 of the housing 24 and has a pilot metering screw assembly 114 located between the pilot burner 112 and the compression fitting 108.

A substantially C-shaped frame 116, made of any suitable non-magnetic material, has one elongated leg 118 located on the upper surface 120 of the intermediate wall 48 of the housing 24. The elongated leg 118 of the frame has an aperture 122 located therein. The frame 116 is secured to the intermediate wall 48 and is positioned so that the aperture 122 in the elongated leg 118 is substantially coincident with the axis of the recess 54 in the intermediate wall 48. The upper leg 24 of the frame 116 has its end 126 located substantially directly over the aperture 122 in the elongated leg 118.

An elongated flapper armature 128 is pivotally mounted by a pin 130 at the base 126 of the upper leg 124 of the frame 116. A spring 132 biases the armature 128 into engagement with the jet 72 so as to close the opening in the jet 72. It is to be noted that the armature 128 is of sufficient length such that it extends downwardly from the upper leg 124 of the frame 116 through the aperture 122 and into the recess 54 of the intermediate wall 48. Armature 128 is positioned so that it can be pivoted between the jet 72 and the orifice 134 of the hollow adjustment screw 74.

Mounted on the elongated leg 118, is a U-shaped magnetic core 136 which has its bight portion 138 extending substantially vertical to the elongated leg 118 of the frame. The lower leg 140 of the magnetic core 136 has its outermost portion 142 extending partially over the aperture 122 in the frame 116. The upper leg 144 of the magnetic core 136 has a winding 146 located thereon. The electrical conductors 148 at each end of the winding 146 of the magnetic core 136 are connected to the terminals 94 located in the sidewall 82 of the upper housing 24.

It will readily be seen, that an electrical current passing through the winding 146 will induce a flux in the magnetic core 136, which flux will actuate the flapper armature 128 so as to pivot the armature 128 about pin 130 located in the upper leg 124 of the frame 116. The flapper armature 128 is positioned on the frame 116 so that when it is pivoted by the induced flux in the magnetic core 136 it will be actuated so as to close the orifice 134 of the hollow adjustment screw 74. Electrical conductors 148 serially connect the winding 146 to a condition responsive unit 150, such as a thermostat, and a thermopile 152. As shown in FIG. 1, the thermopile 152 is located closely adjacent to the pilot burner 112 so that electrical energy is continuously generated in the thermopile 152 when the pilot light is burning.

Also, as shown by dotted lines in FIG. 1, a safety valve 154 is connected in parallel circuit relationship with the thermopile 152. The condition responsive unit 150 is not in this parallel circuit, the reason for which will be explained below.

The main burner 156 is operatively connected to the outlet chamber 14 by a conduit 158. It is of course understood, that the pilot 112 will be located closely adjacent to the main burner 156 and that consequently the thermopile 152 will be heated by the operation of the main burner 156; but, as previously stated, the thermopile 152 is closely adjacent the pilot 112 and will be wholly energized by the pilot 112 when the main burner 156 is inoperative. Further, it is to be understood that the condition responsive unit 150 is operatively associated with the main burner 156, but need not necessarily be located closely adjacent the main burner 156 as the condition responsive unit 150 can be located in a space to which heat is supplied, such as a room in a dwelling or a hot water heater (not shown).

In operation, the pilot burner 112 is normally supplied with gas flow so that the flame therefrom will continuously heat the thermopile 152 thereby generating electrical energy in the circuit 160. The flame of the pilot burner 112 can be adjusted by the pilot metering screw assembly 114 located between the pilot burner 112 and the compression fitting 108 communicating with the upper chamber 90 of the housing 24. As shown in FIG. 1, there is a continuous gas flow from the inlet chamber 12 through passages 22 and 28 to the horizontal passage 58, where the gas flow passes through the hollow adjustment screw 74 into the recess 54 located in the intermediate wall 48 of a housing 24. The gas flow then passes from the recess 54 through the aperture 122 in the frame 116 into the upper chamber 90 of the housing 24 where it communicates with the tubular members 110 supplying the pilot 112. It is to be noted, that the thermopile 152 is generating electrical energy but the magnetic core 136 has no induced flux generated therein as the condition responsive unit 150, which is serially connected in the circuit 160, is in the open position thereby opening the circuit 160. The flapper armature 128, is in its normal biased position to prevent gas flow through the jet 72.

However, as shown in FIG. 1, the gas is present in the intermediate chamber 50 as it is free to flow from the inlet chamber 12 through passages 20 and 26 to the hollow orifice screw 60 and thence through the port 52 to the intermediate chamber 50. The valve 42 is held in the closed position as there is no pressure differential acting on the diaphragm 36 between the inlet chamber 12 and the intermediate chamber 50; and, the weight 44 retains the valve 42 in its closed position.

In FIG. 1, when the condition responsive unit 150 calls for heat, the circuit 160 from the thermopile 152 to the winding 146 on the magnetic core 136 is closed, and the thermopile 152 energizes the winding 146, inducing a flux in the magnetic core 136. The flapper armature 128, now being in the magnetic field, is attracted to the end portion 142 of the lower leg 140 of the magnetic core 136. The attraction of the flapper armature 128 is sufficiently great to overcome the bias of the spring 132. As the armature 128 pivots about pin 130, it simultaneously opens jet 72 and closes the orifice 134 of the hollow adjustment screw. The gas flow to the pilot burner 112 is now from the inlet chamber 12 through passages 20 and 26, hollow orifice screw 60, jet 72, the upper housing chamber 90, and fitting 108. It is to be noted, that the flow rate to the pilot burner 112 is essentially the same as before, as the orifices 70 and 134, in the hollow orifice screw 60 and the hollow adjustment screw 74 are substantially of the same cross sectional area. Further, the hollow adjustment screw 74 can be variably displaced within the recess 54 to insure rapid closing of the orifice 134 in the hollow adjustment screw 74; and also, to insure proper engagement of the orifice 134 with the flapper armature 128.

As previously stated, the outlet orifice 70 of the hollow orifice screw 60 is closely adjacent to the port 52, which communicates with the intermediate chamber 50 above the diaphragm 36. Upon actuation of the flapper armature 128, the gas flow passes through the hollow orifice screw 60 and through the jet 72. The hollow interior of the jet 72 has a greater cross sectional area than the hollow interior of the hollow orifice screw 60. Gas flow through orifice 70 of the hollow orifice screw 60 creates a reduced pressure at the exit of the hollow orifice screw 60 as it expands to enter the hollow interior of the jet 72. The reduced pressure at the exit of the hollow orifice screw 60, suction vents the intermediate chamber 50 above the diaphragm 36. As the gas pressure in the intermediate chamber 50 is reduced, the gas pressure in the inlet chamber 12 displaces the diaphragm 36 in an upward direction, thereby displacing valve 42 in the vertical upward direction which opens valve 42. Opening of valve 42 allows gas flow from the inlet chamber 12 to the outlet chamber 14, which supplies the main burner 156. Gas flow to the main burner 156 is ignited by the pilot 112.

When the condition responsive unit 150 no longer calls for heat, the contacts (not shown) located thereon are opened; thereby opening the circuit 160. As a result, the winding 146 of the magnetic core 136 is deenergized, releasing the flapper armature 128 to close jet 72.

The gas flow to the pilot 112 is now as it was originally, in which the flow is from the inlet chamber 12 through passages 22 and 28, the hollow adjustment screw 74, the upper chamber 90 of the housing 24 to the compression fitting 108. When the jet 72 is closed by the flapper armature 128, there is a gas flow through passages 20 and 26, the hollow orifice screw 60, the port 52, to the intermediate chamber 50. As the pressure in the intermediate chamber 50 will be substantially the same as the pressure in the inlet chamber 12, the pressures on each side of the diaphragm 36 are substantially equal, so that the valve 42 will close due to the weight 44 forcing the valve 42 downward into engagement with the valve seat 40. In this manner, the gas flow to the main burner 156 is cut off.

Should pilot flame failure occur when the valve 42 is in the closed position, the thermopile 152 will no longer generate electrical energy and by the dotted line conductors 162 and 164 a safety valve 154 on the inlet side of the inlet chamber 12 of the control device will be actuated to completely shut off all gas flow.

In the modification shown in FIGS. 2, 3, 4, 5, 6, and 7, the various elements shown therein that are identical to the elements shown in FIG. 1, have been identified with the same reference numerals.

Figure 2:
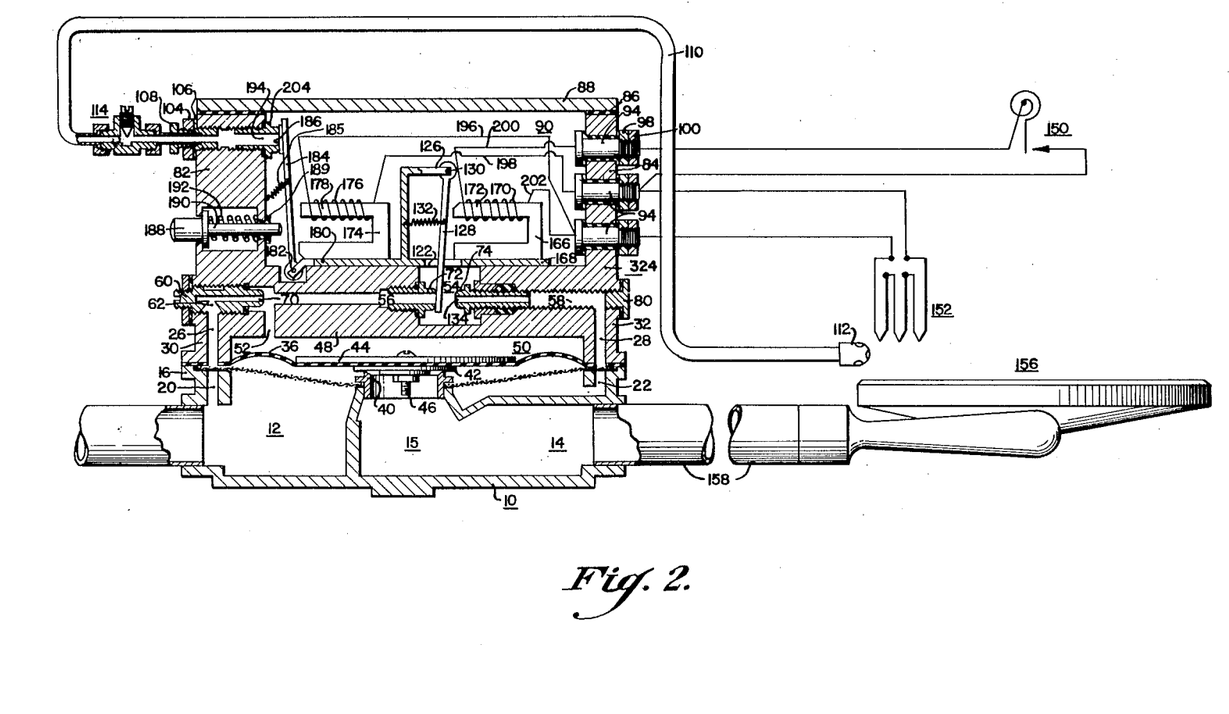
FIG. 2 is a similar partial schematic view of another fluid control device arrangement.

As shown in FIG. 2, the control device has a valve body 10 having an inlet chamber 12, an outlet chamber 14, and a valve chamber 15, and gas passages 20 and 22. A housing 324, having similar gas passages 26 and 28 as shown in FIG. 1, is mounted to the valve body by suitable securing means (not shown).

In this particular embodiment, the flapper armature 128 is actuated by a U-shaped magnetic core 166, mounted on an inverted T-shaped frame 168, which has a winding 170 on upper leg 172. The winding 170 is serially connected to a condition responsive unit 150, such as a thermostat, which in turn is connected to a thermopile 152. In addition, the upper chamber 90 of the housing 324 has a second U-shaped magnetic core 174 mounted on the frame 168 supporting the flapper armature 128. The second magnetic core 174 has a winding 176 on its upper leg 178 which is connected in parallel circuit relationship with the first magnetic core 166. Attached to the base portion 180 of frame 168 by pin 182 is a pilot shutoff armature 184 which has a valve facing 186 located at its outer end. As shown in FIG. 2, a compression fitting 108 secured in place by lock nut 104 is located in the upper portion of sidewall 82 and is operatively connected to the pilot burner 112 by the tubular member 110. Located beneath the compression fitting 108 is a pushbutton 188 attached to a rod 190, and a compression spring 192 positioned as shown. A gas seal 189 slidably positions rod 190 in sidewall 82. The pilot shutoff armature 184 is biased in the closed position by spring 185 so that the valve facing 186 will engage the aperture 194 in the fitting 204, as shown in FIG. 2. Terminals 94 are mounted in sidewall 84 and are oppositely disposed from the compression fitting 108 in the sidewall 82.

The flapper armature 128 and the pilot shutoff armature 184, as well as magnetic cores 166 and 174, are constructed of a material of lower magnetic retentivity. A gasket 86 and a plate 88 are secured to the upper chamber 90 of housing 24, the housing 24 which in turn is secured to the valve body 10 by a plurality of nut and bolt assemblies (not shown).

The device, as shown in FIG. 2, has gas present at inlet pressure in the inlet chamber 12 intermediate chamber 50 and upper chamber 90 of the housing 324. Accordingly, as the pressure is the same in both the inlet chamber 12 and the intermediate chamber 50, the diaphragm 36 and the valve 42, which engages the valve seat 40, is retained in the closed position by the weight 44 plus the pressure differential between the intermediate chamber 50 and the outlet chamber 14. As the aperture 194 in the fitting 204 is closed by the engagement of the valve facing 186 on the pilot shutoff armature 184, there is no gas flow to the pilot 112.

The windings of magnetic cores 166 and 174 are connected in parallel circuit relation with the thermopile 152 by conductors 196, 198, 200, and 202. A thermal responsive unit 150 is connected in series circuit relation with magnetic core 166.

To initiate the operation of the system when both the pilot 112 and the main burner 156 are extinguished, the pushbutton 188 is urged into engagement with the pilot shutoff armature 184, thereby pivoting the valve facing 186 on the pilot shutoff armature 184 away from the aperture 194 in the fitting 204. By automatic or manual means, a flame is ignited at the pilot 112. Gas flow through the fitting 204 and the compression fitting 108 will supply the pilot 112 to maintain the pilot in an operative state.

Once pilot 112 is ignited, the pilot will energize thermopile 152. The electrical energy generated by thermopile 152 will be sufficient to induce a magnetic flux in magnetic core 174. The pilot shutoff armature 184 will be in the flux field and will be pivoted to, and retained in, the open position by the induced flux generated in the magnetic core 174.

When the condition responsive unit 150 calls for heat, thus closing the contacts (not shown), the condition responsive unit 150 is then serially connected between the winding 170 of magnetic core 166 and the thermopile 152. When the winding 170 of magnetic core 166 is energized by thermopile 152, a flux is induced within the core thereby moving the flapper armature 128 into engagement with the hollow adjustment screw 74. Jet 72 is now opened, initiating gas flow through the hollow orifice screw 60. Gas flow through the hollow orifice screw 60 will evacuate the intermediate chamber 50 thereby decreasing the pressure therein. As the pressure in the inlet chamber 12 is greater than the pressure in the intermediate chamber 50, the diaphragm 36 will be raised, thus vertically disengaging the valve 42 from its valve seat 40. The inlet chamber 12 will then communicate with the outlet chamber 14 to permit gas flow.

When the condition responsive unit 150 no longer calls for heat, the circuit energizing the magnetic core 166 is opened, thereby deenergizing the winding 170. The flapper armature 128, biased by spring 132, will pivot to the position shown in FIG. 2, to close jet 72. The electrical circuit to the magnetic core 174, however, is not deenergized and the pilot shutoff armature 184 will be retained by the flux induced in magnetic core 174, in the open position. Aperture 194 in the fitting 204 will allow gas flow to the pilot 112.

If pilot failure occurs, or there is a break in the conductors comprising the thermopile, the windings 170 and 176 on the magnetic cores 166 and 174, respectively, would be deenergized. The pilot shutoff armature 184 would then return to its biased position closing aperture 194 in fitting 204, thereby preventing gas flow to the pilot 112. Likewise, jet 72 will be closed, thereby creating substantially equal pressures on both sides of the diaphragm 36. The weight 44 on the diaphragm 36 will move the valve 42 downwardly in the vertical direction to engage the valve seat 40.

Figure 3:
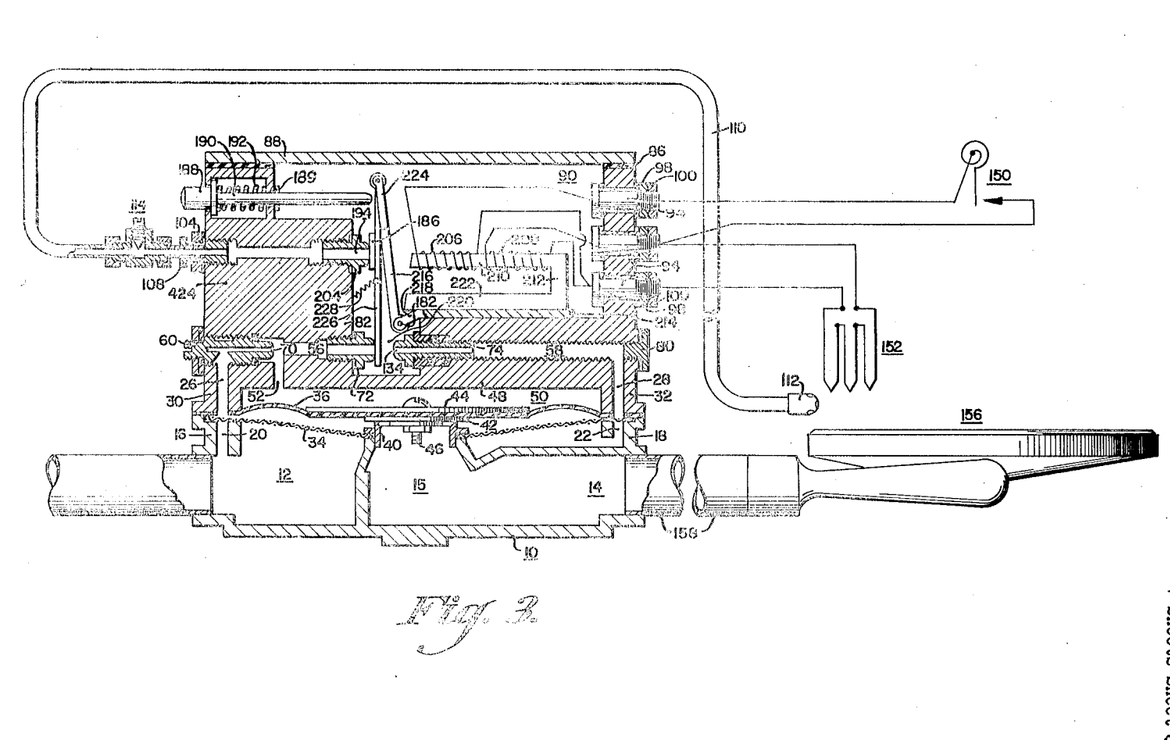
FIG. 3 is another modification of a fluid control device arrangement in which two windings are located on one magnetic core.

The modification shown in FIG. 3 is similar to FIG. 2, except that two separate windings 206 and 208 are located on one leg 210 of a magnetic core 212. The valve body 10 is similar to the valve body 10 shown in FIGS. 1 and 2, and has substantially the same diaphragm 36 actuated valve 42 with passages 20 and 22 from the inlet chamber 12 to the upper chamber 90 of the housing 24. The passages 26, 28, 56, and 58 for the hollow orifice screw 60 and the hollow adjustment screw 74, respectively, the port 52, and the jet 72 are positioned substantially the same as shown in FIGS. 1 and 2. In FIG. 3, however, the aperture 194 of the fitting 204 supplying the pilot burner 112 is located beneath the pushbutton 188. In addition, the jet 72 and the aperture 194 to the pilot burner 112 are spaced on the same sidewall 82 of the upper chamber 90 of the housing 424.

Attached to the intermediate wall 48 of the housing 424 is a flat plate frame 214 made of the non-magnetic material. An armature keeper 216 is pivoted about the end portion 218 of the frame 214 closely adjacent to the recess 220 and closely adjacent to the lower leg 222 of the magnetic core 212. The armature keeper 216 extends upwardly into the central and upper portions of the upper chamber 90, and has substantially a yoke or Y-shaped configuration to provide two upwardly extending arms 224 (only one of which is shown). Suspended between the two upwardly extending arms 224 of the armature keeper 216 is an armature flapper 226 which extends downwardly into the recess 220. In the position shown in FIG. 3, the armature flapper 226 has a soft valve facing 186 attached intermediate its length, which valve facing closes the aperture 194 in the fitting 204 connecting the pilot 112. The lowermost portion of the armature flapper 226 closes jet 72. The armature flapper 226 is biased into engagement with the apertures to the fitting 194 and the jet 72 by spring 228.

The armature keeper 216 is either constructed of a different material or has a different cross sectional configuration from the armature flapper 226 for the particular embodiment shown in FIG. 3. The keeper 216 was designed to be of a different material or to have a different cross sectional configuration from the flapper 226 so that it reaches magnetic saturation at a relatively low value. As the magnetic core 212 will have variable flux, depending upon whether winding 208 is energized, or whether both windings 206 and 208 are energized, the armature flapper 226 and the armature keeper 216 are designed accordingly, to thereby be actuated separately. Armature keeper 216 is pivoted by actuation of pushbutton 188 and rod 190 into engagement with magnetic core 212. Energization of winding 208 will supply magnetic flux of a sufficient value to retain armature keeper 216 in engagement with the magnetic core 212. If both windings 206 and 208 are energized, there will be an increase in the total magnetic flux in the core 212, which will be in excess of that needed for the keeper 216 to reach magnetic saturation. The excess flux is therefore available to attract the armature flapper 226. Since the armature flapper 226 must be pulled in magnetically through an air gap, the flux required is much greater than the flux required to retain the armature keeper 216 in engagement with the magnetic core 212. The magnetic core 212 and the winding 208 are designed to keep the flux of the winding 208 sufficiently low so that it does not reach a value sufficient to pivot the armature flapper 226. When winding 206 on the magnetic core 212 is energized, the flux induced and the excess flux from winding 208 will attract the armature flapper 226. The value of the flux is high enough to insure attraction of the armature flapper 226 to provide an adequate safety margin.

Referring more particularly to FIG. 3, the control device is in the "off" position with no gas flowing to either the main burner 156 or the pilot 112. Gas pressure is substantially the same in the inlet chamber, the passages in the housing, the port, the intermediate chamber 50, and the upper chamber 90 of the housing 424. Flow of gas to the pilot 112 can be initiated by urging pushbutton 188 into engagement with the armature flapper 226. The armature flapper 226 will rotate about the jet 72, as the pushbutton is urged into engagement, thereby opening the aperture 194 in the fitting 204. Gas now flows to the pilot 112. The pilot burner 112 is now ignited by automatic or manual means, which energizes thermopile 152. Electrical energy will now be supplied to winding 208 on the magnetic core 212 which will induce a flux within the core. The flux induced within the magnetic core 212 is sufficient to retain the armature keeper 216 in engagement with the legs 210 and 222 of the magnetic core 212. As the armature flapper 226 is separated from the legs 210 and 222 of the magnetic core 212 by a greater air gap, it is not affected by the flux induced in the magnetic core by winding 208.

If the condition responsive unit 150 calls for an increase in heat, contacts (not shown) will be closed, energizing the parallel circuit in which winding 206 is serially connected. Upon energization of winding 206, the flux induced in magnetic core 212 by both windings 206 and 208 will be in excess of that value required to saturate the armature keeper 216 and thus the excess flux is diverted outwardly attracting the armature flapper 226, thereby pivoting it about the arm 224 of the armature keeper 216 tending to engage armature flapper 226 with the legs 210 and 222 of the magnetic core. The pivotal movement of the armature flapper 226 opens jet 72 and closes the orifice 134 in the hollow adjustment screw 74. A flow of gas, supplying the pilot burner 112, through the hollow orifice screw 60, creates a low pressure at the exit opening of the hollow orifice screw 60 to thereby reduce the pressure in the intermediate chamber 50. As the pressure of the inlet chamber 12 will then be of a greater value than the intermediate chamber 50, the diaphragm 36 will move upwardly in the vertical direction, thereby disengaging the valve 42 from the valve seat 40 to allow gas flow from the inlet chamber 12 to the outlet chamber 14 and its operatively connected main burner 156.

Pilot failure or failure due to line breakage in the thermopile circuit will deenergize windings 206 and 208 of the magnetic core 212. The deenergized windings 206 and 208 will release the armature assembly comprising the armature flapper 226 and the armature keeper 216 to close both the jet 72 and the aperture 194 to the fitting 204, thereby preventing gas flow to the pilot. Either the closing of the jet 72 or the aperture 194 to the pilot 112 will increase the pressure in the intermediate chamber 50 to a value substantially the same as the pressure in the inlet chamber 12. Once the inlet pressure and the intermediate chamber pressure are equal or substantially equal, the weight 44 on the diaphragm 36 will close the valve 42, as previously described.

In the particular embodiments shown in FIGS. 2 and 3, it is to be noted that safety valve 154, as shown in FIG. 1, on the inlet side of the inlet chamber 12, has been eliminated as the particular control device shown in FIGS. 2 and 3 automatically closes both the main valve 42 and the pilot gas flow to pilot 112 if there is a pilot failure or failure in the thermopile 152.

Figure 4:
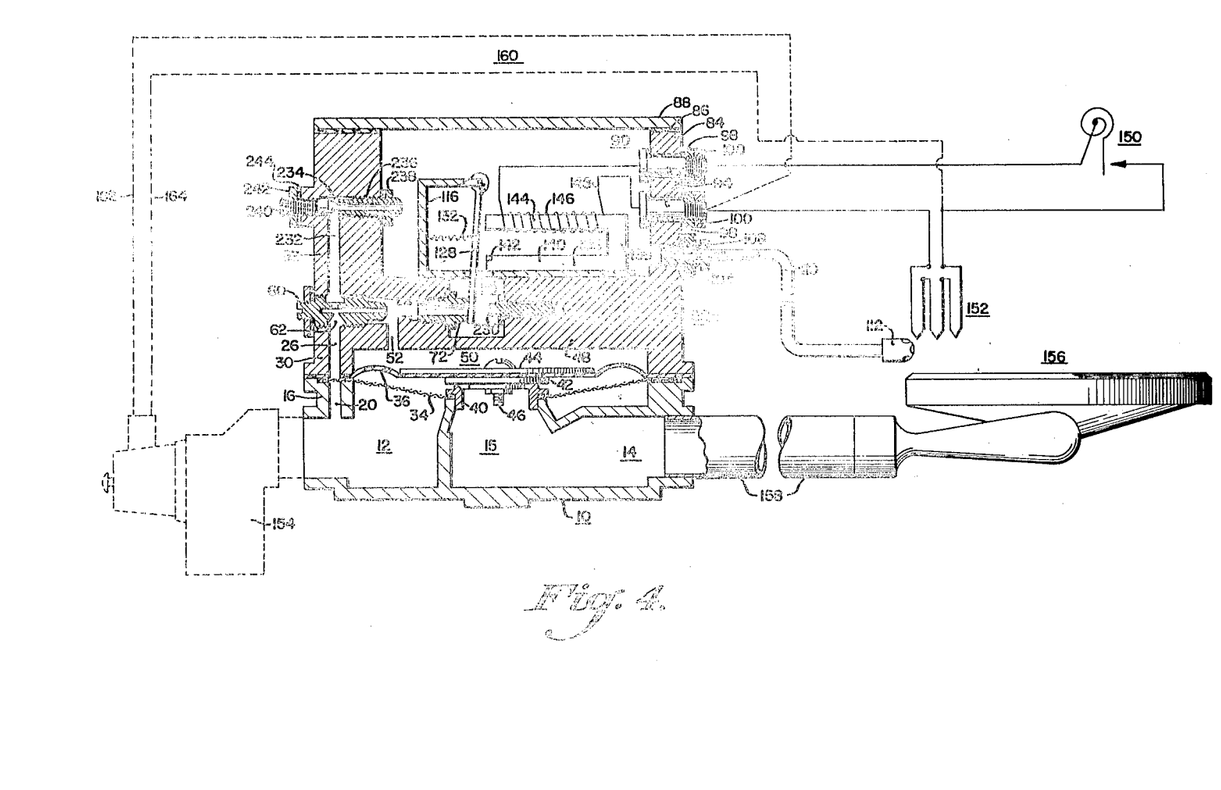
FIG. 4 is still another modification of a fluid control device.

The embodiment of FIG. 4 is similar in circuitry and electro-mechanical operation to the embodiment shown in FIG. 1, except that the passages 22, 28, 58, and the hollow adjustment screw 74 connecting the inlet chamber 12 with the upper chamber 90 have been eliminated. As shown in FIG. 4, an adjustment screw 230 is located in the recess 54 of the intermediate wall 48 of the housing 524. The adjustment screw 230, adjusts the air gap between the flapper armature 128 and the U-shaped magnetic core 136 when the flapper armature 128 is pivoted to open the jet 72. The passage 26 in the housing 524 connecting the hollow orifice screw 560 with the inlet chamber 12 is extended upwardly in the sidewall 82 of the housing 524, to form passage 232.

Passage 232 is connected to a second horizontal passage 234 which connects the upper chamber 90 of the housing 524 with the inlet chamber 12. Passage 234 has a tapped hole portion 236 which threadedly engages a hollow orifice 238 at its outlet into the upper chamber 90 of the housing 524. The horizontal passage 234 also has its outer portion tapped to threadedly engage a pilot metering screw 240 which is made gas tight by a lock nut 242 and rubber washer 244.

It will readily be seen that there will be a continuous gas flow through passages 232 and 234 from the inlet chamber 12 to the upper chamber 90 of the housing 524. The cross sectional area of the passage in the hollow orifice screw 560 is smaller than the cross sectional area of the passage in the hollow orifice 238, as the main function of the hollow orifice screw 560 is to evacuate the intermediate chamber 50, thereby actuating the diaphragm 36 and valve 42. As previously described relative to FIG. 1, when the main burner 156 is in operation, the jet 72 will be open, which together with the hollow orifice 238 allows for an increased gas flow from the inlet chamber 12 to the pilot 112.

The particular gas flow system shown in FIG. 4, which can be termed the parallel type, is more desirable in areas where there is a low pressure supply of gas, as the gas flow to the pilot 112 will not be substantially affected when the gas flow to the main burner 156 is interrupted. As the hollow orifice 238 has a higher capacity for gas flow than the hollow orifice screw 560, the major portion of the gas flow to the pilot 112 passes through the hollow orifice 238. This gas flow is generally unaffected by any opening or closing of the hollow orifice screw 560. The operation of the control device shown in FIG. 4 is identical to that previously described relative to FIG. 1 except as noted above.

Figure 5:
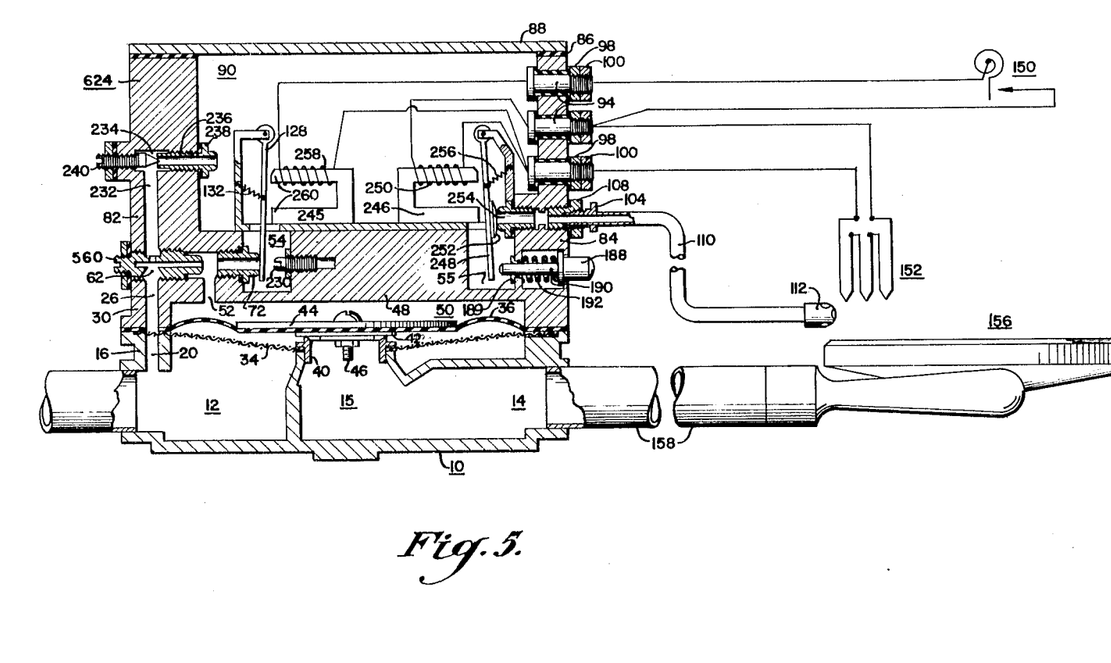
FIG. 5 is a partial schematic view showing still another modification of the present invention.

In the modification shown in FIG. 5, the passages and orifices that were previously described in FIG. 4 are located in substantially the same relationship. In addition to magnetic core 245, a second magnetic core 246 has been added which actuates armature 248. Magnetic core 246 has its winding 250 serially connected to thermopile 152. The elongated armature 248, associated with the magnetic core 246, has a valve 252 attached thereto to close the orifice 254 to the pilot burner 112. The outer end of the armature 248 extends downwardly into a second recess 55. Operatively connected to the recess 55 is pushbutton 188 attached to rod 190 extending through gas seal 189 and spring 192. Thermopile 152 associated with the pilot burner 112 will generate and supply electrical energy to both of the magnetic cores 245 and 246.

As shown in FIG. 5, the control device is in the "off" position with no gas flow to either the main burner 156 or the pilot burner 112. Gas is present at inlet chamber pressure in the upper chamber 90 of the housing 624 by passages 20, 26, and 232 and horizontal orifice 238. In addition, gas is present in the intermediate chamber 50 above the diaphragm 36 by passages 20, 26, hollow orifice screw 560, and port 52.

To light the pilot 112, the pushbutton 188 is urged into engagement with the armature 248 opening orifice 254 to the pilot 112. Gas flow is now initiated through the orifice 254 to the pilot 112. The pilot 112 can be ignited manually or automatically. After the pilot 112 becomes operative, the heat generated will energize the thermopile 152 to supply electrical energy to the winding 250 of magnetic core 246. The flux induced in magnetic core 246 will retain the armature 248 in the open position and will be of sufficient force to overcome the bias of spring 256, which urges the armature 248 into the closed position.

In this condition, the valve 42 is still in the closed position since there is no differential pressure between the inlet chamber 12 and the intermediate chamber 50 to force the valve 42 from its seat 40. When a condition responsive means 150, such as a thermostat, calls for heat, the contacts (not shown) associated with the thermostat will be closed, whereby the winding 258 on magnetic core 245 will be energized by the electrical energy generated in the thermopile 152. The flux induced in magnetic core 245 tends to pull the armature flapper 128 into engagement with the ends 260 of the magnetic core 245, thereby opening jet 72. In this condition, it should be noted that windings 250 and 258 on each of the magnetic cores 245 and 246 are energized, thereby retaining their respective armatures 128 and 248 in the open position. When jet 72 is opened, gas flow will take place in the hollow orifice screw 560; and, as previously stated, the intermediate chamber 50 will be evacuated by the decrease in pressure present immediately adjacent to the outlet 70 of the hollow orifice screw 560. The pressure in the intermediate chamber 50 will be less than that present in the inlet chamber 12, thereby forcing the diaphragm 36 upwardly to open valve 42.

When condition responsive unit 150 no longer calls for heat, the contacts (not shown) in the condition responsive unit are separated, and the winding 258 on magnetic core 245 is deenergized. This releases the armature flapper 128 which is then biased by spring 132 to close jet 72. Pressure is then increased in the hollow orifice screw 560, the port 52 and in the intermediate chamber 50 above the diaphragm 36, which pressure will be substantially the same as that present in the inlet chamber 12, whereby the valve 42 will close. A continuous gas flow exists between the inlet chamber 12 and the upper chamber 90.

Figure 6:
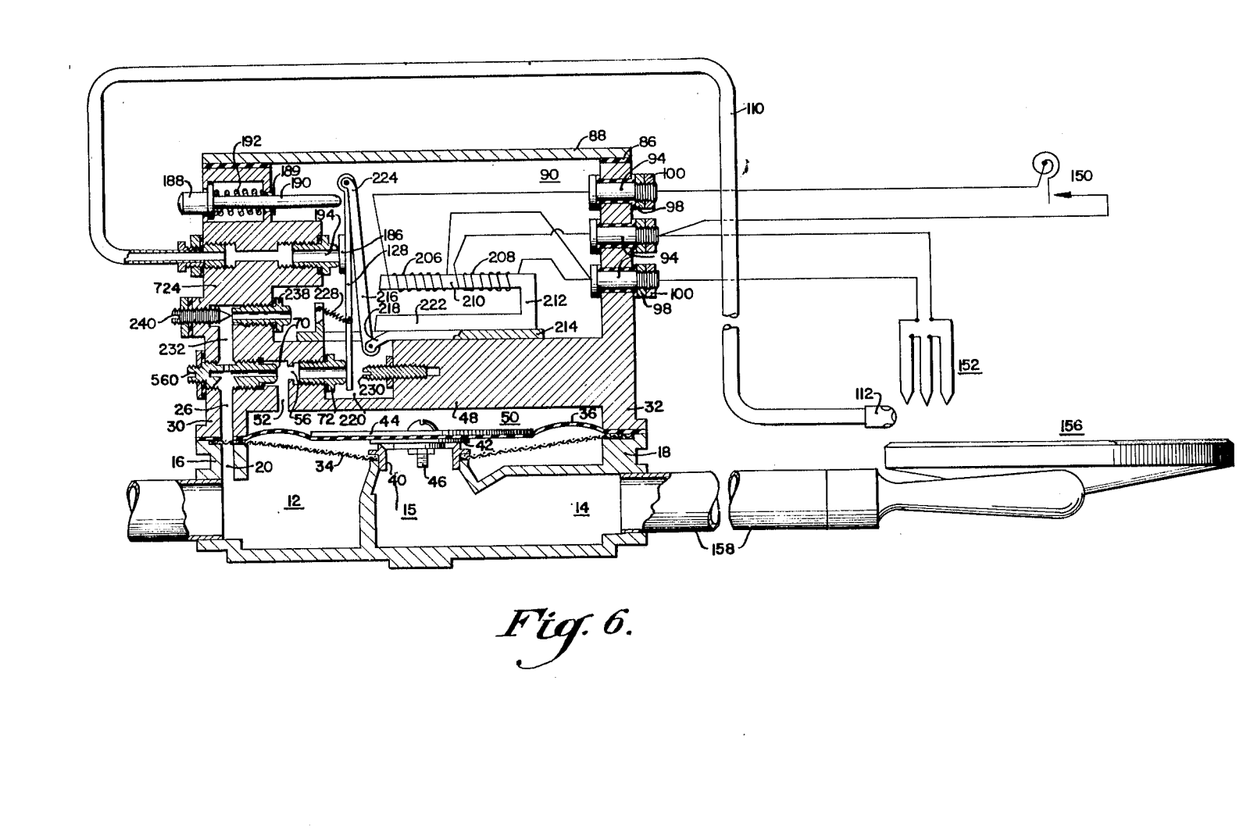
FIG. 6 is another modification of the present invention.

The embodiment of FIG. 6 is similar to that of FIG. 3 except that a hollow orifice 238 is connected adjacent to the hollow orifice screw 560 by passage 232. At the juncture of the passage 232 and the hollow orifice 238, there is placed a metering screw 240 which controls the gas flow to the pilot 112. Hollow orifice screw 560 is smaller in cross sectional area than the hollow orifice 238, so that a greater portion of the gas flow to the pilot 112 will flow through the hollow orifice 238, thus assuring a substantial continuous supply.

The description of the operation of the control device is substantially the same as that given in connection with FIG. 3. It is, however, to be pointed out that the device shown and described in FIG. 6 will more efficiently operate in areas where the gas pressure on the inlet side of the control device is substantially lower than normal. When the pilot inlet 194 is open, the pressure on the gas supplied to the pilot 112 will be substantially the same as the pressure in the inlet chamber 12. As a relatively small pilot flame is required to energize thermopile 152, the size of the flame is controlled by the volumetric rate of gas passing through the metering screw 240. When gas is admitted to the main burner 156, the jet 72 also supplies gas to the pilot 112, thereby increasing the volumetric rate of gas to the pilot 112 to produce a larger flame for ignition. It is particularly desirable to have a strong pilot flame when the main burner 156 is ignited as the inrush of gas to the main burner upon ignition can blow out the pilot flame. This is particularly true when a relatively low pressure is present in the inlet chamber 12.

Figure 7:
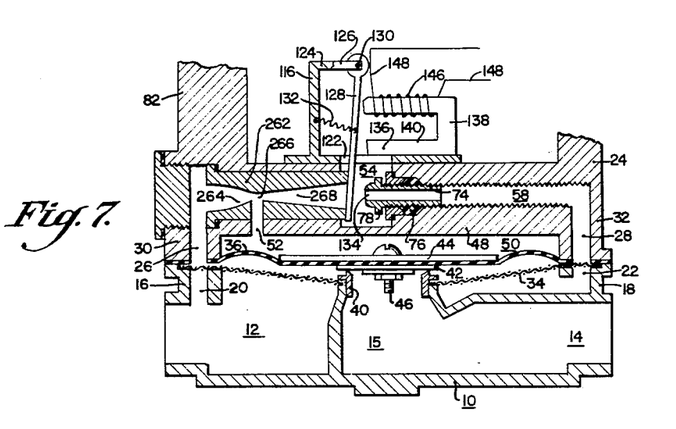
FIG. 7 is a cross sectional view of a venturi nozzle that can be incorporated in the embodiments of the fluid control device of the invention, as shown in FIGS. 1 through 6.

While the hollow orifice screw 560 is of simple design, it does not provide the best depressurization for the intermediate chamber 50. As shown in FIG. 7, this invention also contemplates the use of a venturi tube 262 which can be used in place of the hollow orifice screw 60 and the jet 72. The smooth bore inlet nozzle 264 of the venturi 262 is tapered to a throat 266 having a minimum cross-sectional area, where it has a smooth bore outlet nozzle 268 which is substantially cone-shaped. The port 52 connects the throat 266 of the venturi tube 262 to the intermediate chamber 50, so that the maximum gas velocity of the venturi tube will be at the throat 266, which is across the inlet of the port 52. It is to be understood that the venturi tube 262 can be used in all of the previously described embodiments and is pictured herein with particular reference to FIG. 1.

An armature flapper 128 is positioned across the outlet nozzle 268 of the venturi tube 262 and will be actuated as described relative to FIG. 1. The use of a venturi tube 262 in place of the hollow orifice screw 60 is desirable because of the higher efficiency obtained at the throat 266 due to a reduction in the turbulence of the gas flow in the smooth bore inlet and outlet nozzles 264 and 268. In addition, the venturi tube 262 will provide a more rapid and positive depressurization in the intermediate chamber 50, thereby rapidly actuating the diaphragm 36 and valve 42.

Figures 8, 9:
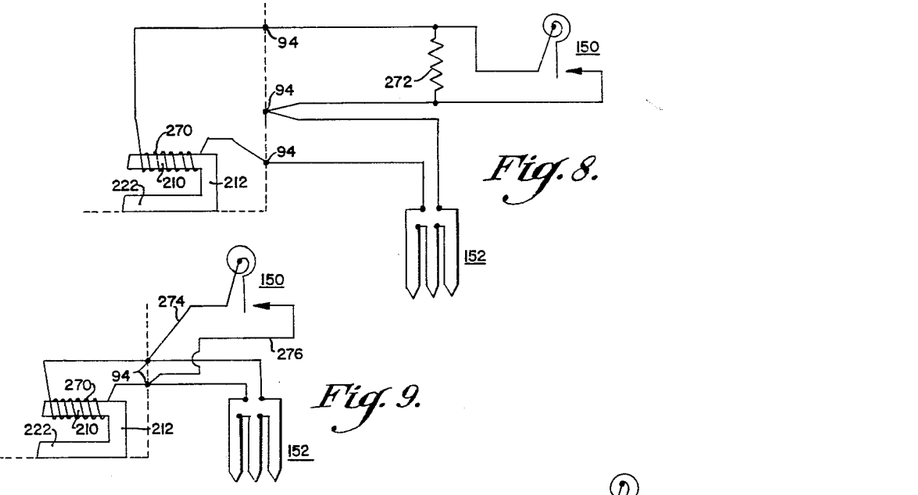
FIG. 8 is another modification of the schematic circuit diagrams shown in FIGS. 3 and 6.
FIG. 9 is still another modification of schematic circuit diagrams shown in FIGS. 3 and 6.

In FIG. 8, there is shown another embodiment of the parallel connected electrical circuit previously described relative to FIGS. 3 and 6. In FIG. 8, the winding 270 on the magnetic core 212 is serially connected with the thermopile 152 and has a resistor 272 and a condition responsive unit 150, such as a thermostat, connected in parallel relation thereto. When the condition exists such that the condition responsive unit 150 does not call for heat, the thermopile 152 is serially connected to the resistance 272 and the winding 270 on the magnetic core 212. Since the thermopile electrical energy output is rather limited, much of the usable power is dissipated in the resistance 272, thereby reducing the available electrical energy for the winding 270. In this condition, the flux induced in the magnetic core 212 will be reduced, thereby actuating only the armature keeper 216 as shown in FIGS. 3 and 6.

When the condition responsive unit 150, in FIGS. 3 and 6, calls for heat, current will flow through the closed contacts (not shown) of the condition responsive unit 150, with a very small flow of electrical energy through the resistance 272 as the resistance 272 has a higher electrical resistance than the condition responsive unit 150. As a result, more electrical energy is available to the winding 270, thus inducing a greater flux in the magnetic core 212, which flux will actuate the armature flapper 226 to open jet 72.

In FIG. 9, there is shown a magnetic core 212 similar to the one previously described relative to FIGS. 3 and 6, in which only two terminals 94 are required in the housing 424 and 724, respectively. In addition, the condition responsive unit 150 can be of the reverse acting type, such as a reverse acting thermostat, wherein, when the condition responsive unit 150 calls for heat, the contacts (not shown) are opened. The winding on the magnetic core 212 is connected to thermopile 152 in parallel relationship with the reverse acting condition responsive unit. When the condition responsive unit does not call for heat, the contacts (not shown) will be closed, whereby the electrical energy generated in the thermopile 152 will partially be dissipated in the conductors 274 and 276 connecting the condition responsive unit to the thermopile. The loss of energy in the electrical conductors 274 and 276 will reduce the electrical energy delivered to the winding 270 on the magnetic core 212. When the condition responsive unit 150 calls for heat, the contacts are open and the winding 270 on the magnetic core 212 is serially connected to the thermopile 152, thereby inducing a greater flux in the magnetic core. In this manner, the armature keeper 216 and the armature flapper 226 can be controlled as previously described relative to FIG. 8.

Figure 10:
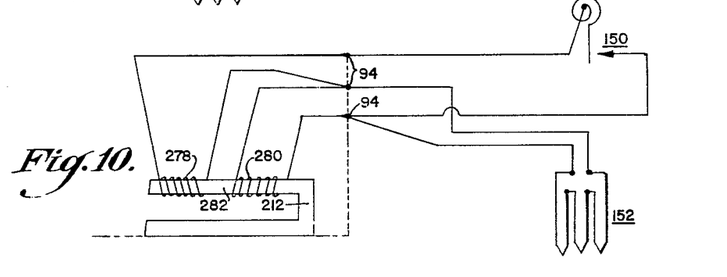
FIG. 10 is a schematic circuit diagram of still another modification of the electrical circuit shown in FIGS. 3 and 6.

In the modification shown in FIG. 10, of the electrical circuit for the control device shown in FIGS. 3 and 6, two oppositely wound windings 278 and 280 are located on one leg 282 of the magnetic core 212. Windings 278 and 280 are connected in parallel circuit relation with a thermopile 152. A condition responsive unit 150, such as a reverse acting thermostat, is connected serially in the circuit of winding 278. When the condition responsive unit 150 calls for heat, its contacts (not shown) will be open, thereby deenergizing winding 278. Thermopile 152 will supply electrical energy to winding 280, which induces flux in the magnetic core 212. The flux induced by winding 280 has sufficient strength to actuate both the armature keeper 216 and the armature flapper 226 previously described relative to FIGS. 3 and 6.

When the condition responsive unit 150 no longer calls for heat, its contacts will close, thereby placing winding 278 in the parallel circuit relationship. As winding 278 is wound on the magnetic core 212 in opposite relationship to winding 280, it will induce a flux in the magnetic core 212 opposite to and smaller than the flux induced by winding 278. In this manner the total flux available in the magnetic core will be substantially reduced and will be of a value such that only the armature keeper 216 will be actuated.

The relative values of the flux induced by either winding 278 or winding 280 can be varied by changing the wire size, the number of turns of either winding, or the material used in the conductors.

It will be apparent from the foregoing, that the illustrated embodiments provide new and improved control devices for maintaining a variable fluid flow. It will also be obvious to those skilled in the are that the illustrated embodiments can be variously changed and modified, or features thereof, singly or collectively, without departing from the scope of the invention or sacrificing all of the advantages thereof, and accordingly, the disclosure herein is illustrative only and the invention is not limited thereto.

I claim:

1. In a fluid control device comprising a valve body having inlet and outlet chambers and side walls extending upwardly from the upper portion of said valve body, a housing having side walls extending downwardly from the lower portion of said housing, an upper chamber in the upper portion of said housing, said housing having said side walls thereof mounted on said side walls of said valve body, an intermediate chamber formed between the lower portion and side walls of said housing and the upper portion and side walls of said valve body, said intermediate chamber communicating with said inlet and outlet chambers, first valve means for closing said outlet chamber, said first valve means separating the intermediate chamber into an upper portion and a lower portion, alternate passages communicating the inlet chamber with the upper chamber of said housing, an aspirating nozzle intermediate one of said alternate passages, a port in said one alternate passage connecting said nozzle to said upper portion of said intermediate chamber, second valve means for opening and closing said one alternate passage while simultaneously closing and opening the other alternate passage whereby said upper chamber is always in communication with said inlet chamber, and thermoelectric means for actuating said second valve means for opening and closing said one alternate passage for controlling fluid flow through said nozzle, said fluid flow controlling the pressure in the upper portion of the intermediate chamber thereby actuating said first valve means for the outlet chamber to the open or closed position.

2. In a fluid control device for combustible fluids comprising, a valve body having side inlet and side outlet passages and having side walls extending upwardly from the upper portion of said valve body, a housing having downwardly extending sidewalls, a wall intermediate the downwardly extending sidewalls of said housing which separates the housing into an upper chamber and a lower chamber, said side walls of said housing being mounted on said side walls of said valve body, an intermediate chamber formed between the intermediate wall and side walls of the lower chamber of said housing and the upper portion and side walls of said valve body, a movable wall means separating the intermediate chamber into an upper portion and a lower portion, said lower portion of said intermediate chamber communicating with said inlet and outlet passages, valve means mounted on said movable wall biased for closing said outlet passage, alternate passages communicating the inlet chamber with the upper chamber of said housing, an aspirating nozzle intermediate the length of one of sad alternate passages, a port in said one alternate passage connecting said nozzle to said upper portion of said intermediate chamber, a pivoted valve closure biased in the normal position for closing said one alternate passage, said valve closure in the actuated position closing said other alternate passages, pilot means operatively connected to said upper housing and continuously supplied with fluid by one of said alternate passages, magnetic means located in said upper chamber for actuating said pivoted valve closure, a thermopile operatively associated with said pilot means for generating electrical energy, electrical conductors electrically connecting said thermopile to said magnetic means, condition responsive means serially connected between said thermopile and said magnetic means for energizing said circuit to open said one alternate passage for fluid flow through said nozzle, fluid flow through said aspirating nozzle controlling the pressure in the upper portion of the intermediate chamber thereby actuating the valve means so as to transmit fluid flow from the inlet to the outlet chamber.

3. In combination, a pilot burner, a main burner, a valve body having side inlet and side outlet passages, said outlet passage always being interconnected to said main burner, a housing having downwardly extending sidewalls, a wall intermediate the downwardly extending sidewalls of said housing which separates the housing into an upper chamber and a lower chamber, said housing mounted on an upper portion of said valve body, an intermediate chamber formed between the wall of the lower chamber of said housing and the upper portion of said valve body, said intermediate chamber communicating with said inlet and outlet passages, a movable wall means separating the intermediate chamber into an upper portion and a lower portion, valve means mounted on said movable wall biased for closing said outlet passage, alternate passages communicating the inlet chamber with the upper chamber of said housing, an aspirating nozzle intermediate the length of one of said alternate passages, a port in said one alternate passage connecting said nozzle to said upper portion of said intermediate chamber, a pivoted first valve closure biased in the closed position for closing said one alternate passage, said first valve closure in the open position closing said other alternate passages, an aperture located in one sidewall of said upper chamber, said pilot burner being operatively connected to said aperture in said upper housing, a second valve closure biased in the closed position for closing said aperture for said pilot burner, individual magnetic means located in said upper chamber for actuating each of said pivoted valve closures, a thermopile operatively associated with said pilot burner for generating electrical energy, electrical conductors electrically connecting said individual magnetic means in parallel circuit relationship, manually operable means for opening said second valve closure, said second valve closure retained in the open position by one of said magnetic means being energized by said thermopile, condition responsive means serially connected in said first valve closure magnetic means circuit to open said one alternate passage for fluid flow through said nozzle, fluid flow through said aspirating nozzle controlling the pressure in the upper portion of the intermediate chamber thereby actuating the valve means so as to transmit fluid flow from the inlet to the outlet chamber.

4. In combination, a pilot burner, a main burner, a valve body having side inlet and side outlet passages, said outlet passage always being interconnected to said main burner, a housing having downwardly extending sidewalls, a wall intermediate the downwardly extending sidewalls of said housing which separates the housing into an upper chamber and a lower chamber, said housing mounted on said valve body, an intermediate chamber formed between the intermediate chamber of the lower chamber of said housing and the upper portion of said valve body, said intermediate chamber communicating with said inlet and outlet passages, a movable wall means separating the intermediate chamber into an upper portion and a lower portion, valve means mounted on said movable wall biased for closing said outlet passage, alternate passages communicating the inlet chamber with the upper chamber of said housing, an aspirating nozzle intermediate the length of one of said alternate passages, a port in said one alternate passage connecting said nozzle to said upper portion of said intermediate chamber, an aperture located in one sidewall of said upper chamber adjacent said one alternate passage said pilot burner being operatively connected to said aperture in said upper housing, a thermopile operatively associated with said pilot burner for generating electrical energy, magnetic means having two separate windings located in said upper chamber, electrical conductors electrically connecting said windings of said magnetic means to said thermopile in parallel circuit relationship, condition responsive means serially connected in one of said windings, an elongated means pivoted at one end about said magnetic means, a valve closure means pivoted about the opposite end of said elongated means, first and second valve members located on said valve closure means to cooperate with said aperture and said one alternate passage, respectively, manually operable means for opening said first valve member, said elongated means operatively pivoted about said magnetic means by one of said windings being energized by said thermopile to retain said first valve member in the open position, said valve closure means operatively pivoted about said elongated means by the second winding being energized by said thermopile in response to said condition responsive means to open said second valve members, fluid flow through said aspirating nozzle controlling the pressure in the upper portion of the intermediate chamber thereby actuating the valve means so as to transmit fluid flow from the inlet to the outlet chamber.

5. In combination, a pilot burner, a main burner, a valve body having side inlet and side outlet passages, said outlet passage always being interconnected to said main burner, a housing having downwardly extending sidewalls, a wall intermediate the downwardly extending sidewalls of said housing which separates the housing into an upper chamber and a lower chamber, said housing mounted on said valve body, an intermediate chamber formed between the intermediate wall of the lower chamber of said housing and the upper portion of said valve body, an intermediate chamber formed between the intermediate wall of the lower chamber of said housing and the upper portion of said valve body, said intermediate chamber communicating with said inlet and outlet passages, a movable wall means separating the intermediate chamber into an upper portion and a lower portion, valve means mounted on said movable wall biased for closing said outlet passage, alternate passages communicating the inlet chamber with the upper chamber of said housing, an aspirating nozzle intermediate the length on one of said alternate passages, a port in said one alternate passage connecting said nozzle to said upper portion of said intermediate chamber, an aperture located in one sidewall of said upper chamber adjacent said one alternate passage, said pilot burner being operatively connected to said aperture in said upper housing, a thermopile operatively associated with said pilot burner for generating electrical energy, magnetic means having a winding located in said upper chamber, electrical conductors electrically connecting said winding of said magnetic means to said thermopile, a resistance and a condition responsive means connected in parallel relationship between said winding and said thermopile, an elongated means pivoted at one end about said magnetic means, a valve closure means pivoted about the opposite end of said elongated means, first and second valve members located on said valve closure means to cooperate with said aperture and said one alternate passage, respectively, manually operable means for opening said first valve member, said elongated means biased to close said valve closure means and operatively pivoted about said magnetic means when said winding and resistance are energized by said thermopile to retain said first valve member in the open position, said valve closure means operatively pivoted about said elonbated means by the winding inducing maximum flux in said magnetic means after being energized by said thermopile in response to said condition responsive means to open said second valve member, said condition responsive means having a lower resistance than said resistance thereby short circuiting said resistance, fluid flow through said aspirating nozzle controlling the pressure in the upper portion of the intermediate chamber thereby actuating the valve means so as to transmit fluid flow from the inlet to the outlet chamber.

6. A combination as claimed in claim 5 wherein the condition responsive means and the winding of the magnetic means are connected in parallel relationship, the conductors of said condition responsive means being of less resistivity than the resistivity of said winding, said condition responsive means in the operative condition substantially reducing flux in said magnetic means whereby the elongated means is operatively pivoted to retain the first valve member in the open position.

7. A combination as claimed in claim 5 wherein separate windings on the magnetic means are connected in parallel relationship, said separate windings inducing opposed flux in said magnetic means, condition responsive means serially connected with one of said windings, said condition responsive means in the operative condition inducing substantially no flux in said magnetic means, whereby the elongate means is biased to close said first and second valve members.

8. In combination, a pilot burner, a main burner, a valve body having side inlet and side outlet passages, said outlet passage always being interconnected to said main burner, a housing having downwardly extending sidewalls, a wall intermediate the downwardly extending sidewalls of said housing which separates the housing into an upper chamber and a lower chamber, said housing mounted on said valve body, an intermeditae chamber formed between the intermediate wall of the lower chamber of said housing and the upper portion of said valve body, said intermediate chamber communicating with said inlet and outlet passages, a movable wall means separating the intermediate chamber into an upper portion and a lower portion, valve means mounted on said movable wall biased for closing said outlet passage, a passage having more than one outlet duct communicating the inlet chamber with the upper chamber of said housing, an aspirating nozzle intermediate the length of one of said ducts, a port in said one duct connecting said nozzle to said upper portion of said intermediate chamber, a pivoted valve closure biased in the closed position for closing the outlet of said one duct, said pilot burner being operatively connected to said upper housing and continuously supplied with fluid by said other ducts, magnetic means located in said upper chamber for actuating said pivoted valve closure, a thermopile operatively associated with said pilot burner for generating electrical energy, electrical conductors electrically connecting said thermopile to said magnetic means, condition responsive means serially connected between said thermopile and said magnetic means for energizing said circuit to open said one duct for fluid flow through said nozzle, fluid flow through said aspirating nozzle controlling the pressure in the upper portion of the intermediate chamber thereby actuating the valve means so as to transmit fluid flow from the inlet to the outlet chamber.

9. In combination, a pilot burner, a main burner, a valve body having side inlet and side outlet passages, said outlet passage always being interconnected to said main burner, a housing having downwardly extending sidewalls, a wall intermediate the downwardly extending sidewalls of said housing which separates the housing into an upper chamber and a lower chamber, said housing mounted on said valve body, an intermediate chamber formed between the intermediate wall of the lower chamber of said housing and the upper portion of said valve body, said intermediate chamber communicating with said inlet and outlet passages, a movable wall means separating the intermediate chamber into an upper portion and a lower portion, valve means mounted on said movable wall biased for closing said outlet passage, a passage having more than one outlet duct communicating the inlet chamber with the upper chamber of said housing, an aspirating nozzle intermediate the length of one of said ducts, a port in said one duct connecting said nozzle to said upper portion of said intermediate chamber, an aperture in said upper housing, said pilot burner being operatively connected to said aperture in said upper housing and continuously supplied with fluid by said other ducts, a first pivoted valve closure biased in the closed position for closing the outlet of said one duct, a second pivoted valve closure biased in the closed position for closing the aperture of said pilot burner, individual magnetic means located in said upper chamber for actuating each of said valve closures, a thermopile operatively associated with said pilot burner for generating electrical energy, electrical conductors electrically connecting said magnetic means in parallel circuit relationship to said thermopile, manually operable means for opening said second valve closure, said second valve closure retained in the open position by one of said magnetic means being energized by said thermopile, condition responsive means serially connected in said first valve closure magnetic means circuit to open said one duct for fluid flow through said nozzle, fluid flow through said aspirating nozzle controlling the pressure in the upper portion of the intermediate chamber thereby actuating the valve means so as to transmit fluid flow from the inlet to the outlet chamber.

10. In combination, a pilot burner, a main burner, a valve body having side inlet and side outlet passages, said outlet passage always being interconnected to said main burner, a housing having downwardly extending sidewalls, a wall intermediate the downwardly extending sidewalls of said housing which separates the housing into an upper chamber and a lower chamber, said housing mounted on said valve body, an intermediate chamber formed between the intermediate chamber of the lower chamber of said housing and the upper portion of said valve body, said intermediate chamber communicating with said inlet and outlet passages, a movable wall means separating the intermediate chamber into an upper portion and a lower portion, valve means mounted on said movable wall biased for closing said outlet passage, a passage having more than one outlet duct communicating the inlet chamber with the upper chamber of said housing, an aspirating nozzle intermediate the length of one of said ducts, a port in said one duct connecting said nozzle to said upper portion of said intermediate chamber, an aperture located in one sidewall of said upper chamber adjacent said one duct, said pilot burner being operatively connected to said aperture in said upper housing, a thermopile operatively associated with said pilot burner for generating electrical energy, magnetic means having two separate windings located in said upper chamber, electrical conductors electrically connecting said windings of said magnetic means to said thermopile in parallel circuit relationship, condition responsive means serially connected in one of said windings, an elongated means pivoted at one end about said magnetic means, a valve closure means pivoted about the opposite end of said elongated means, first and second valve members located on said valve closure means to cooperate with said aperture and said duct, respectively, manually operable means for opening said first valve member, said elongated means operatively pivoted about said magnetic means by one of said windings being energized by said thermopile to retain said first valve member in the open position, said valve closure means operatively pivoted about said elongated means by the second winding being energized by said thermopile in response to said condition responsive means to open said second valve member, fluid flow through said aspirating nozzle controlling the pressure in the upper portion of the intermediate chamber thereby actuating the valve means so as to transmit fluid flow from the inlet to the outlet chamber.

11. In combination, a pilot burner, a main burner, a valve body having inlet and outlet chambers intersected by a valve seat, said outlet chamber always being interconnected to said main burner, said body having a pilot chamber always interconnected to said pilot burner, said body having passage means interconnecting said pilot chamber with said inlet chamber, said body having an intermediate chamber adjacent said inlet and outlet chambers, a movable wall separating said intermediate chamber from said inlet and outlet chambers, a valve member carried by said movable wall and cooperable with said valve seat for controlling flow between said inlet and said outlet chambers, an aspirating nozzle having the suction side thereof communicating with said intermediate chamber and being interconnected to said passage means, electromagnetic valve means for regulating the flow of fluid through said nozzle, and means for energizing said valve means in response to a predetermined condition and thereby causing fluid flow from said passage means through said nozzle for evacuating said intermediate chamber to actuate said movable wall, said passage means always interconnecting said inlet chamber with said pilot chamber regardless of the position of said valve means whereby said inlet chamber is always interconnected to said pilot burner.

12. In combination, a pilot burner, a main burner, a valve body having inlet and outlet chambers separated by a valve seat, said outlet chamber always being interconnected to said main burner, said body having a pilot chamber always interconnected to said pilot burner, said body having passage means interconnecting said pilot chamber with said inlet chamber, a movable wall valve member for opening or closing said valve seat, said body having an intermediate chamber adjacent said movable wall opposite said outlet chamber, an expansion nozzle communicating with said intermediate chamber and being interconnected to said passage means, and valve means actuable to cause fluid flow from said passage means through said nozzle for evacuating the intermediate chamber to thereby actuate the movable wall valve member to open said valve seat, said passage means always interconnecting said inlet chamber with said pilot chamber regardless of the position of said valve means whereby said inlet chamber is always interconnected to said pilot burner.

References Cited in the file of this patent
UNITED STATES PATENTS

| | | |
|---|---|---|
| 2,294,694 | Ray | Sept. 1, 1942 |
| 2,417,994 | Sheets | Mar. 25, 1947 |
| 2,599,457 | Jones | June 3, 1952 |